United States Patent [19]

Seamons et al.

[11] Patent Number: 4,924,330

[45] Date of Patent: May 8, 1990

[54] SYSTEM AND METHOD FOR IMPROVING THE PERFORMANCE OF HIGH-DENSITY DATA STORAGE MEDIA

[75] Inventors: John K. Seamons, San Anselmo; Kevin P. Grundy, San Jose, both of Calif.

[73] Assignee: NeXT, Inc., Redwood City, Calif.

[21] Appl. No.: 255,337

[22] Filed: Oct. 11, 1988

[51] Int. Cl.⁵ .............................................. G11B 5/03
[52] U.S. Cl. ...................................... 360/66; 364/200
[58] Field of Search .................. 360/39, 60; 364/200, 364/900

[56] References Cited

PUBLICATIONS

R. Freese, "Optical Disks Become Erasable", *IEEE Spectrum*, Feb. 1988, p. 41.

Peter Norton's Inside OS/2 by R. Latore et al, Brady Books © 1988, (pp. 10 & 11).
Inside the IBM PC by P. Norton, Brady Books © 1986, (pp. 139 & 140).
IBM OS/2 S.E. Licence Information, (p. 2).

*Primary Examiner*—Vincent P. Canney
*Attorney, Agent, or Firm*—Laurence S. Rogers; Jeffrey H. Ingerman

[57] ABSTRACT

In a computer system equipped with a magneto-optical disk drive having high data density, and therefore lengthy format times, and also requiring an erase step before each write operation, a system and method for decreasing user waiting time is provided. The system and method format the disk on a continuous basis during "disk-idle" periods rather than all at once. The system and method also erase disk portion belonging to deleted data in advance during disk-idle periods, so they are ready for the next write operation.

30 Claims, 4 Drawing Sheets

SYSTEM AND METHOD FOR IMPROVING THE PERFORMANCE OF HIGH-DENSITY DATA STORAGE MEDIA

BACKGROUND OF THE INVENTION

This invention relates to high-density data storage media. More particularly, this invention relates to improving the performance of magnetooptical data storage media.

Disk drives have been included as data storage devices in computers for some time. There are various types of disk drives and media. The so-called "floppy" disk is a removable, relatively fragile magnetic data storage medium which has a relatively low data density. Higher data densities are available on so-called "hard" disk drives (also known as "fixed" or "Winchester" drives), which are also magnetic.

Whenever a disk medium is used for the first time, it must be formatted. Formatting involves the testing by the computer of every area of the disk to make sure it can be accurately written to and read from. In addition, sector header information is written to disks which are soft-sectored. If during the formatting process a subdivision (i.e., track, sector or cylinder) of a disk is determined to be defective (i.e., information cannot accurately be written to and read from the subdivision), information is written to the disk to identify the defective subdivision so that it is not used. Formatting can be a relatively lengthy process, and it becomes more lengthy as the density, or data storage capacity, of the disk increases.

Until recently, personal computers and other smaller computers did not have disk drives of such capacity that the time required to format a disk was considered excessive. Recently, however, fixed disk drives for personal computers have become available with storage capacities in the hundreds of megabytes, and format times have increased.

Most recently, optical disk storage media have been introduced. In one type of optical disk, referred to as "magneto-optical", information is stored magnetically, but is written and read with a laser. However, magneto-optical disk drives have longer format times than magnetic disk drives. Formatting a 250-megabyte magneto-optical disk can take several hours, which may be many times the format time for a magnetic disk of comparable capacity. Not only are format times increased for magneto-optical disks but the time needed to store data on such disks is also increased. The reason for these increases is that data cannot be written onto a location on a magneto-optical disk unless that location has first been erased. This differs from a magnetic disk where new data can be written directly over old data, without the need for first erasing that old data. Because disk drives spin continually, and because only one operation can be performed on a particular disk location each time that location passes the read/write head, which is once per disk revolution, it takes up to three full disk revolutions to erase, write on, and verify a magneto-optical disk. Thus, as compared to a hard disk drive, the latency, or rotational delay (the time needed for data to rotate under the head once the head is in position over the appropriate track), of a magneto-optical disk drive is undesirably increased. As a result, the average data transfer rate for storing data on a magneto-optical disk is decreased as compared to the rate of most magnetic hard disks.

In light of the foregoing, it would be desirable to be able to provide a way to format high density data storage media on a time-distributed basis, rather than formatting such media all at once.

It would also be desirable to be able to provide a way to decrease the time needed to store data on a magneto-optical disk, by eliminating the need to erase at the time a write request is made.

SUMMARY OF THE INVENTION

It is therefore an object of this invention to provide a way to format high density data storage media on a time-distributed basis, rather than all at once.

It is also an object of this invention to provide a way to decrease the time needed to store data on a magneto-optical disk, by eliminating the need to erase at the time a write request is made.

In accordance with an aspect of the present invention, there is provided, in a computer system having at least one high density data storage medium (the data storage medium having a large number of data storage subdivisions, such as sectors or tracks, and requiring lengthy format times), a system and method for formatting the medium on a time-distributed basis. The formatting system includes means for maintaining a list, table or other record of status information for each of the subdivisions. The status information includes an indication of whether or not each subdivision has been formatted. The system also includes means for determining when the computer system is "disk-idle", meaning that neither the system nor the user has accessed (i.e., written to or read from) the disk for a period of time. The system further includes means, responsive to such a disk-idle determination, for selecting an unformatted or virgin subdivision, and means for formatting that selected subdivision. The formatting means also operates to format a virgin subdivision in the event that the computer system requires access to a formatted subdivision for storage of information, but the maintained status information indicates that no formatted subdivisions exist.

In accordance with another aspect of the present invention, there are provided a system and method for maintaining a list of previously-used subdivisions to be erased and erasing them whenever the computer system is disk-idle.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
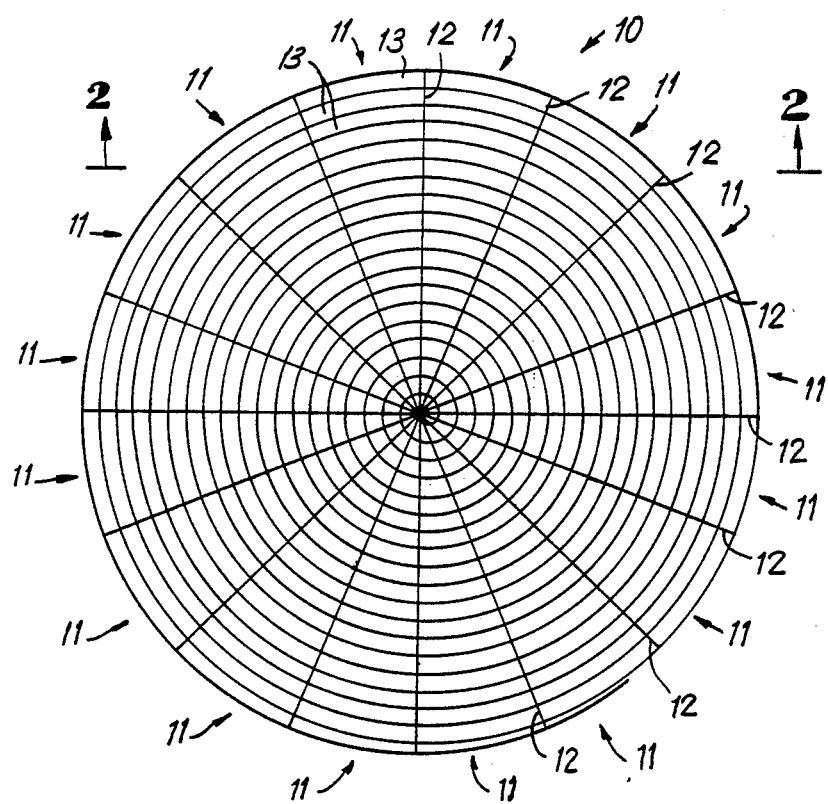
FIG. 1 is a schematic diagram of a magneto-optical disk divided, into tracks and sectors.

The surface of a magneto-optical disk 10 of a type with which the present invention may be used is shown in FIG. 1. In order to be able to find data on disk 10, or any disk, the disk is divided into subdivisions, and when files are stored on the disk, a record is kept of which subdivision or subdivisions contain the file. Traditionally, these subdivisions have been organized as tracks and sectors. A track in a magnetic disk is one of a number of concentric rings of data storage areas on the disk. The disk is also divided radially into geometric sectors. A particular memory subdivision can then be located by giving its track number to fix its radial distance from the center of the disk and its geometric sector number to fix its angular position. In practice, the area of the specified track that coincides with the specified geometric sector is referred to as a data storage "sector". A sector is the smallest addressable subdivision, and is capable of storing many bytes of data. In a floppy or hard magnetic disk, tracks and sectors are fixed magnetically at the time of formatting. Such disks are "soft-sectored".

Although the sectors and tracks of magneto-optical disks can be arranged in different ways, in a preferred embodiment of a magneto-optical disk such as disk 10, the geometric sectors 11 are "hard"—i.e., they are formed in the surface of disk 10 at the time of manufacture. A magneto-optical hard-sectored disk, of the type with which the present invention may be used, is the Model OMD-1 Magneto-Optical Disk Drive manufactured by Canon Inc., of Tokyo, Japan. Whereas the sectors of a soft-sectored disk are not visible to the user, the lines 12 forming geometric sectors 11 on a hard-sectored magneto-optical disk are visible. Further, while the tracks of a magnetic disk and some magneto-optical disks are concentric rings, tracks 13 of magneto-optical disk 10 in the preferred embodiment are really one spiral, with every 360-degree turn of the spiral defined as a track 13. Magneto-optical disk 10 is read and written by a laser, as discussed more fully below. The laser can be very finely focused, so that tracks 13 are actually much narrower than shown schematically in FIG. 1. In the OMD-1 magneto-optical disk, for example, tracks 13 are 1 micrometer wide and there are 15,625 such tracks in a 5.25"-diameter removable disk cartridge. Each track 13 is subdivided into sixteen sectors 11, with each sector having a formatted data storage capacity of 1,024 bytes, exclusive of overhead such as sector identification and error correction bytes.

Figure 2:
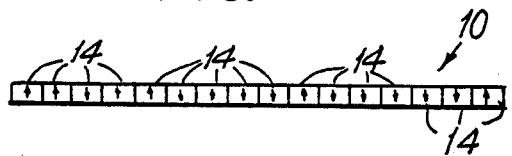
FIG. 2 is a schematic representation of a cross section of a portion of the disk of FIG. 1, taken from line 2—2 of FIG. 1.

FIG. 2 schematically shows individual magnetic domains 14 in the cross section of disk 10. As in the case of tracks 13, magnetic domains 14 are actually quite small because of the fineness of the laser which reads and writes disk 10. In the OMD-1 magneto-optical disk, there are 336 million magnetic domains per square inch of disk 10. The orientation of each magnetic domain is represented in FIG. 2 by an arrow. When a magnetic domain 14 is oriented up, it is deemed to represent a logical 1. When it is oriented down, it is deemed to represent a logical 0. Actual data is encoded using a two-out-of-seven code. Such a code has the property, useful for higher storage density, that only two out of seven bits of encoded data are 1 for every valid code combination.

Disk 10 is made of polycarbonate coated with a thin film of magnetic material in which magnetic domains 14 are stable at room temperature even in the presence of a sizable magnetic field. In a blank disk, all magnetic domains 14 point in the same direction. At room temperature, a coercive force of about 400,000 amps/meter is required to change the orientation of magnetic domains 14. However, above a threshold temperature, the force required to reorient a magnetic domain 14 reduces to a negligible amount. Disk 10 is therefore written by heating each domain to be written to the threshold temperature and applying a magnetic field in the desired direction. The domain cools quickly once heat is removed, fixing its orientation. Only the heated domain assumes the desired orientation. Spot heating of individual domains, which are on the order of 1 micrometer wide, is achieved using a laser. A suitable laser would be an infrared laser with a wavelength of about 825 nanometers.

Reading of disk 10 is accomplished using the same laser, but at lower power. According to a magneto-optic effect known as the Kerr Effect, when the laser beam is reflected from a particular magnetic domain 14, its polarization depends on the orientation of magnetic domain 14. The polarization of the reflected beam can be detected, and if the original polarization is known, the orientation of magnetic domain 14—and hence the data represented by the domain—can be deduced.

When any type of disk storage device is formatted (be it magnetic or magneto-optical), all magnetic domains are erased, and then predetermined data patterns of 1's and 0's are written to the disk. The data is then read back to verify that it was stored accurately. Error correction logic is provided, and some errors in the raw data read from the disk are tolerated during verification if they can be corrected by the error correction logic. Any areas or sectors having data errors that cannot be corrected by error correction logic and verified are marked as bad. Formatting also reserves space on the disk for various tables. For example, a bitmap table is set up in which the status of each sector is indicated. The table includes two bits per half-track. An entry of 00 indicates that the half-track is untested (not yet attempted to be formatted); an entry of 01 indicates that part or all of the half-track failed the formatting process and the half-track is bad (as discussed above); an entry of 10 indicates that the half-track is written; and an entry of 11 indicates that the half-track is erased. For each half-track indicated as bad, an alternate half-track is assigned, if available, from among a pool of extra half-tracks on the disk, and an associative table (called the "bad block table") of allocation of alternates is also created on the disk. If a bad block (half-track) is encountered, the bad block table is used to allocate an alternate block, preferably nearby, to substitute for the bad one.

In the preferred embodiment of the present invention, these tables are kept for half-tracks, each of which contains eight sectors, primarily to reduce the size of the various tables. However, it will be appreciated by those skilled in the art that the table can be kept on a sector or other basis, as may be convenient. In any event, no matter how the tables are arranged, it will be apparent that the formatting process involves a lot of activity, not the least of which is the writing of each magnetic domain 14, as discussed above. Formatting an entire disk thus can take several hours for a magneto-optical disk 10 with a capacity of 256 megabytes, as stated above. The time required to format a complete hard magnetic disk of like capacity is also substantial. Formatting times obviously increase as the storage capacity of disks increases.

With conventional systems, end users, and computer system manufacturers who provide bundled software already stored on disk media, must wait for the entire formatting process to be completed before the media may be used to store information. Whereas such a wait might, at best, be only inconvenient for a user, it can be expensive in terms of manufacturing time and productivity for a manufacturer. It thus would be desirable to reduce the time required to format a disk before the disk may be used to store data.

It is not practical, however, to reduce the number of operations involved in the formatting process without sacrificing the reliability of the disk in use. Therefore, in accordance with the present invention, the formatting process is spread out over time. The total time needed for formatting generally is not much more than formatting all at once, but by formatting in a time-distributed manner, the user or system manufacturer does not have to wait for the entire process to be complete before using disk 10.

In time-distributed formatting according to the preferred embodiment of the invention, an unformatted disk (whether magnetic, magneto-optical, or other kind) is formatted from a predetermined time after the computer is turned on until there is a disk request from an application program. The user thus can perform normal computing activities requiring disk access. The computer will keep track (in the status table referred to above) of which subdivisions (half-tracks or sectors) have, and which have not yet, been formatted. A timer detects when the computer has been disk-idle for a predetermined time—e.g., ten seconds (although the time may be set to any different value as may be desired-)—based on lack of disk requests. In response to the timing out of the timer, the computer selects unformatted areas of the disk and proceeds to format those areas until interrupted by a disk request from a user application. Eventually, all of the disk will have been formatted in a background operation. The process does not, however, prevent a regular disk request. If a user application is so disk-intensive that it uses up all of the formatted areas, or if the disk is new and so little of it is formatted by the time a user application makes a disk request that no formatted space is available, the system immediately formats additional space, rather than wait for disk-idle time. When this occurs, the user application is forced to wait, but this should happen only rarely. Because the formatting process is a built-in feature of the operating system which takes place during disk-idle periods as long as the power is on and there are unformatted areas on disk 10, the user has the option of formatting the entire disk in advance by simply leaving the computer turned on for several hours—e.g., overnight—without performing any other disk functions.

Thus the present invention allows a user of a computer equipped with high density magneto-optical disk drives to use a disk without waiting the time necessary to format the entire disk, while still achieving complete formatting of the disk. Further, although the time-distributed formatting of the present invention was developed in connection with magneto-optical disks 10, it can be used with any data storage medium.

The present invention also relieves the second speed disadvantage of magneto-optical disks referred to above—i.e., the need to erase old data before writing new data. This requirement of present magneto-optical disks means that every disk write operation takes at least two passes over a particular area of the disk, one for erasing and one for writing. A third pass for verifying generally also is required, but may be skipped by drives which can write reliably. While it is not possible at present to dispense with the erase step, the invention reduces the time needed for a write operation by performing the erase step ahead of time where possible.

As in the formatting process described above, in accordance with the "pre-erase" process of the present invention, the computer keeps track of half-tracks to be pre-erased. A list or table of half-tracks to be pre-erased is maintained by the operating system in the main memory of the computer, although it also may be maintained on the disk itself. The list is updated by the operating system whenever a disk file is deleted by the user or by an application program leaving half-tracks available for storage of new data. As above, when the computer has been disk-idle for a predetermined time period—again, e.g., 10 seconds without disk access, the timing out of a background timer causes the computer to select designated half-tracks on the disk and to erase those half-tracks until interrupted by a disk request from a user application. Eventually, all designated half-tracks will be erased in the background, although, as before, it is possible that a user application may need to write to a disk that has no erased half-tracks. In that case, the write operation will take longer because the erase step will have to be performed before the write operation for each half-track that is to be written. In addition, there are certain write operations for which the erase step cannot be performed in advance. For example, if the disk directory or one of the other status tables maintained on the disk has to be changed, that half-track cannot be pre-erased because the old information is current until the new information is written. The system does not know in advance when the user is going to do something that will change the directory or the other tables. In addition, if, as in the preferred embodiment, the list is kept in main memory, it is volatile. Therefore, any half-tracks on the pre-erase list that have not been preerased before the system is turned off or reset will not be pre-erased. However, for those write operations where data can be written on a pre-erased half-track (e.g., when data files are stored for application programs), the present invention significantly reduces the duration of the write operation from about 60 msec to about 40 msec.

In the preferred embodiment, the pre-erase process has priority over the formatting process. On a disk-idle determination, the system will check the pre-erase list before it checks the formatting status table, although in the preferred embodiment there is no pre-erase list when the system is turned on or reset, so that at those times formatting occurs first. The invention could also be implemented so that the priorities are different. For example, the system could interleave pre-erase and formatting operations by half-track upon the occurrence of a single disk-idle determination, or could perform pre-erase and formatting operations on alternate disk-idle determinations, assuming that both unformatted half-tracks and half-tracks to be pre-erased existed. Similarly, the invention could be implemented such that no pre-erasing takes place until the disk is fully formatted, on the theory that it is more important to completely format the disk and that if erased disk space is needed then formatting will provide it. Alternatively, the invention could be implemented such that formatted portions of the disk are pre-erased before the entire disk is formatted. The priorities could be set by specific program instructions, or by making the time period for a disk-idle determination for one process shorter than time period for a disk-idle determination for the other process. In such a case, when the shorter period elapsed the system would perform the first process, but if the longer period elapsed and the system was still disk-idle (except for the first process), it would switch to the second process.

Figure 3:
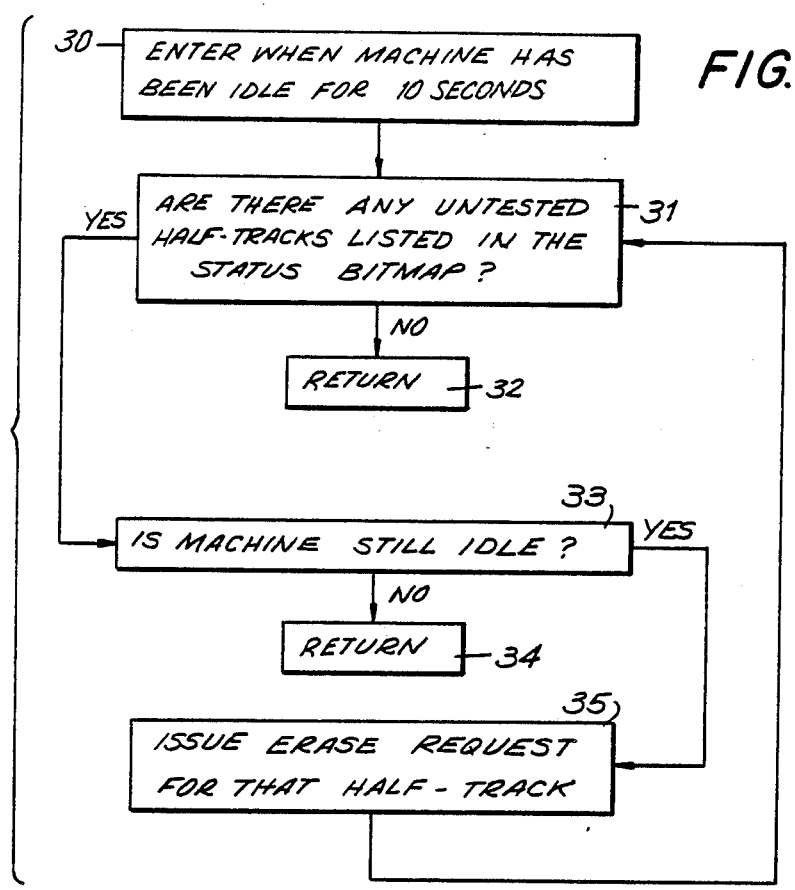
FIG. 3 is a flow diagram of a portion of the process implemented by the system and method of the invention to format a magneto-optical disk.

FIG. 3 is a flow diagram of the formatting process. At step 30, the system enters the formatting process based upon the timing out of a conventional timer, which indicates that the system is disk-idle because no disk requests have been issued for a predetermined time period. In the preferred embodiment, the timer generates an interrupt every second, causing system software to increment a counter and then to check whether or not the counter value corresponds to the passage of the predetermined period. As shown in FIG. 3, that period is ten seconds, although another period may be selected. Because there is little machine overhead involved in terminating the formatting process (or the pre-erase process of FIG. 4), the period chosen can be relatively short. At step 31, the system determines whether or not there are any unformatted (i.e., untested) half-tracks listed in the status bitmap (the table showing the statu s—untested, bad, written, erase—of each half-track, kept on the disk). If there are no unformatted half-tracks listed (indicating that the disk is completely formatted), the system returns at step 32. If unformatted half-tracks are listed in the status bitmap, the system tests at step 33 to make sure no disk requests were issued during step 31. If at step 33 the machine is determined to be no longer idle, the program returns at step 34. Otherwise, an erase request is issued at step 35 for the half-track in question, and the system loops back to step 31 to check for additional unformatted halftracks. The handling of the erase request at step 35 is diagrammed in FIG. 5, discussed below.

Figure 4:
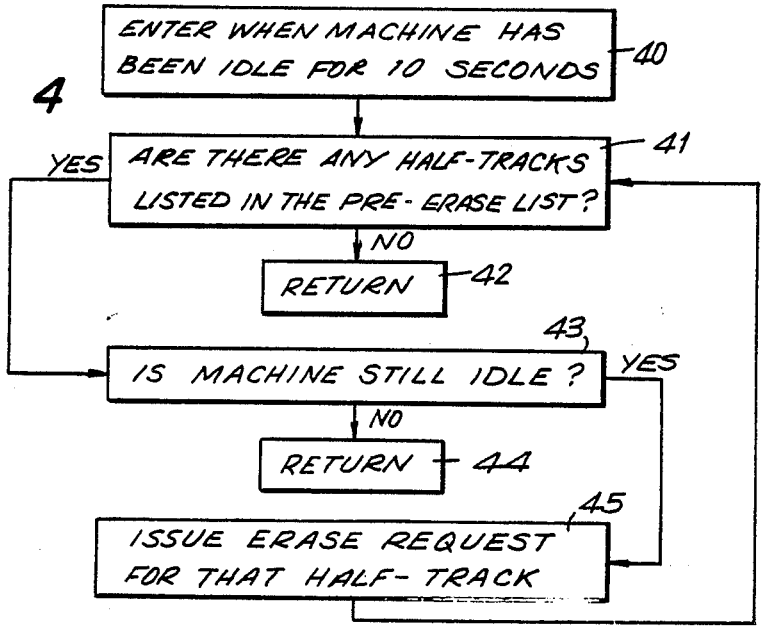
FIG. 4 is a flow diagram of a portion of the process implemented by the system and method of the invention to pre-erase magneto-optical disk areas.

FIG. 4 is a flow diagram of the pre-erase process. This process is logically similar to the formatting process, so that FIG. 4 is similar in structure to FIG. 3, and the software implementing the process uses many of the same routines as the formatting process. At step 40, the system enters the pre-erase process based on an indication from the software timer that the machine is idle because no disk requests have been issued for a predetermined period, here 10 seconds, although, as above, other periods may be selected. At step 41, the system tests for half-tracks to be erased in the pre-erase list. (As discussed above, when a file is deleted, its half-tracks are marked in a conventional manner as not being needed and placed on the pre-erase list. However, a pre-erase cannot be performed on a particular half-track unless the entire half-track belongs to a single deleted file.) If the pre-erase list contains no half-tracks, the program returns at step 42. If half-tracks are listed in the pre-erase list, the system tests at step 43 to make sure no disk requests were issued during step 41. If at step 43 the machine is determined to be no longer idle, the program returns at step 44. Otherwise, an erase request is issued at 45 for the half-track in question, and the system loops back to step 41 to check for additional half-tracks in need of being pre-erased. As stated above, the handling of the erase request is diagrammed in FIG. 5.

Figure 5:
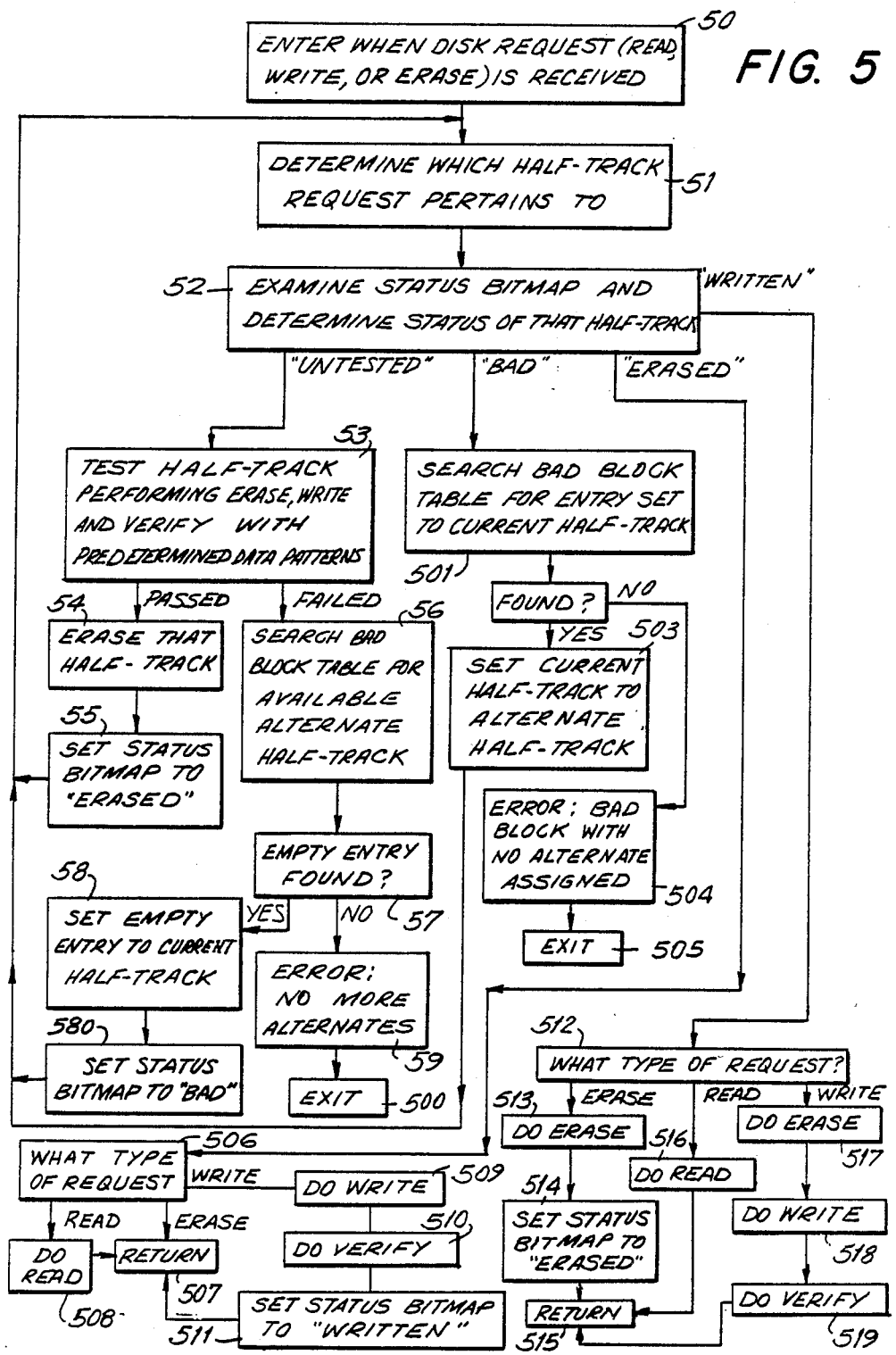
FIG. 5 is a flow diagram of a portion of the process implemented by the system and method of the invention when a disk request is processed.

FIG. 5 is a flow diagram illustrating the process by which the system implements the three possible types of disk requests—read, write, and erase. The system enters the disk request handling process at step 50 on issuance of a disk request. At step 51, the program determines to which half-track the request pertains, and at step 52 it examines the status bitmap to determine the current status of that half-track. From step 52, any of four branches may be taken depending on which of four possibilities represents the status of the half-track: "untested," "bad," "erased," or "written." If the half-track status is "untested," the half-track has never been formatted and the process branches to step 53, where the half-track is formatted. Formatting involves (1) erasing the half-track, (2) writing a test pattern of data to the half-track, and (3) reading the stored test pattern data from the half-track and verifying that those data correspond to the data that were written. The three-step cycle may be repeated several times using different data patterns to test different parameters of the disk drive system. The test pattern may be a string of 0's, a string of 1's or some other pattern. For example, in a preferred embodiment of the invention, a test pattern which modulates the laser in a "worst case" manner is used. If the half-track passes the verification test at step 53, the process branches to step 54 where the half-track is erased. The status bitmap is then updated at step 55 to show that the half-track is erased, and the system loops back to step 51 to continue processing the original request. If the half-track fails the verification test at step 53, the program branches to step 56 where it searches the bad block table of the disk for an available alternate half-track to substitute for the failed half-track. At step 57, the system determines whether or not an alternate half-track exists. If so, the empty entry in the bad block table corresponding to the available alternate half-track is set at step 58 to the current half-track, resulting in a mapping of the current (bad) half-track to the alternate (good) half-track. The system sets the status bitmap to "bad" at step 580 and then loops back to step 51 to continue processing the original request. If no alternate half-tracks are determined to be available at step 57, then at step 59 the system recognizes an error condition and exits the disk request handling process at step 500.

If the status at step 52 is "bad," the system branches to step 501 where the bad block table is searched for an entry mapping the current half-track to an alternate half-track. At step 502, the system determines whether or not such an entry was found. If so, the current half-track is set at step 503 to the alternate half-track and the system loops back to step 51 to continue processing the original request. If no entry is found at step 502, the system recognizes an error condition at step 504 because a bad half-track was not assigned an alternate half-track, and exits the disk request handling process at step 505.

If the status at step 52 is "erased," the system branches to step 506 where the type of request is determined. If the request is an erase request, the system branches to step 507, where it returns to complete the process. If the request is a read request, the system branches to step 508 where it performs the read, and returns at step 507. If the request is a write request, the system branches to step 509, where it performs the write. It then verifies the write at step 510 by reading it back, sets the status bitmap entry for that half-track at step 511 to "written," and returns at step 507.

If the status at step 52 is "written," the system branches to step 512 where the type of request is determined. If the request is an erase request, the system branches to step 513 where it performs the erase. It then sets the status bitmap entry for that half-track at step 514 to "erased," and returns at step 515. If the request is a read request, the system branches to step 516 where it performs the read, and returns at step 515. If the request is a write request, the system branches to step 517 where it first erases the half-track (the status at step 52 was "written," meaning that the system had not previously found time to pre-erase the half-track it now wants to write on). It then performs the write at step 518, verifies the write at step 519 by reading it back, and returns at step 515.

Hardware System

Figure 6:
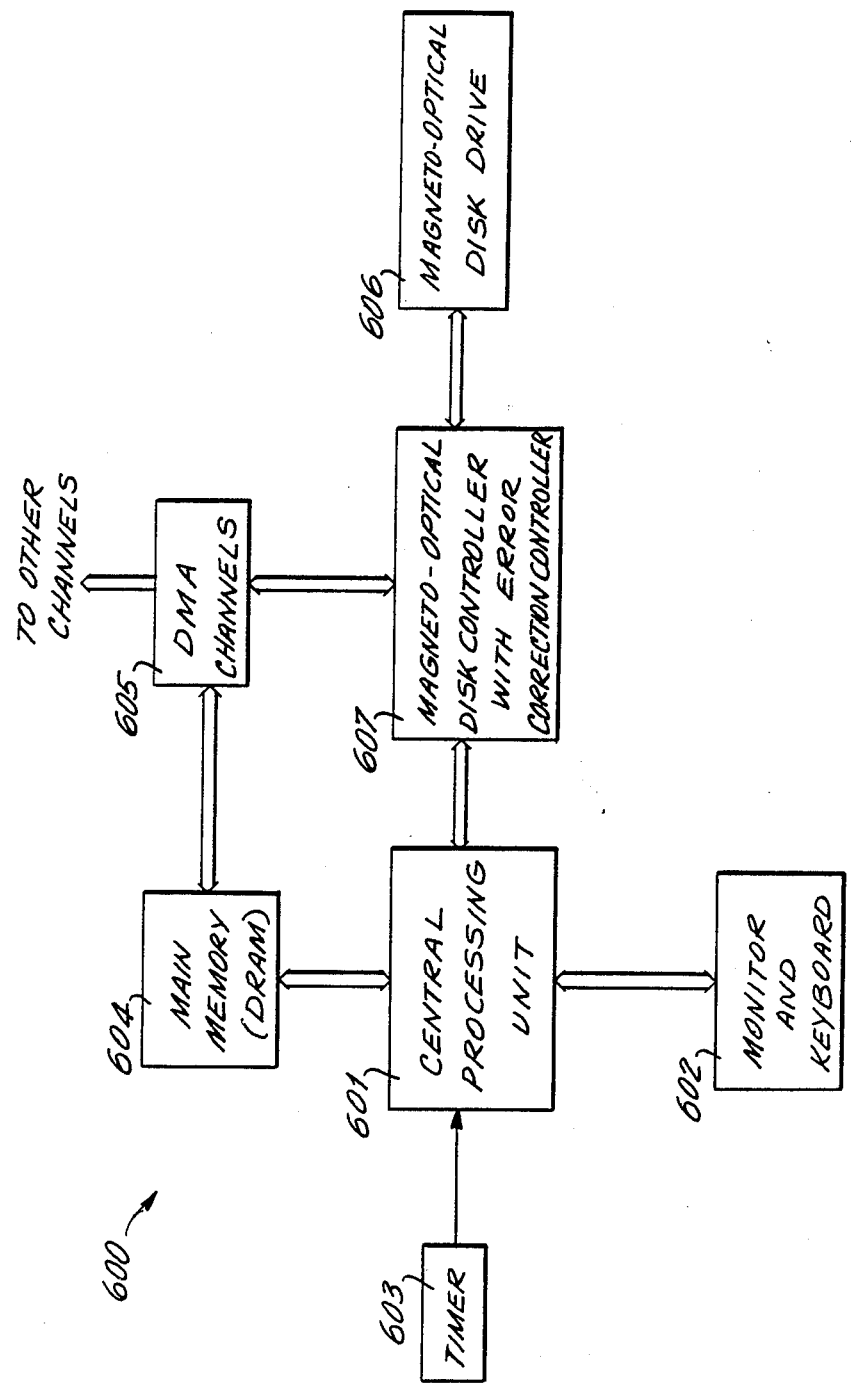
FIG. 6 is a block diagram of an exemplary hardware configuration for a computer on which the system and method of the invention is implemented.

While the present invention may advantageously be used on nearly any computer system, an exemplary hardware system 600 on which the present invention is implemented is shown in FIG. 6. The system includes a central processing unit (CPU) 601, such as a Motorola 68030 microprocessor, and a user interface such as conventional monitor and keyboard 602. A conventional hardware timer 603 supplies various timing signals, including the interrupts referred to above in connection with FIG. 3, to CPU 601. The system also includes main memory (dynamic random access memory) 604, which CPU 601 can read from and write to. Main memory 604 is also in two-way communication with direct memory access (DMA) channels 605 which in turn communicate with other channels on the system bus (not shown). An OMD-1 disk drive 606 as described above is connected in two-way communicating relationships with both CPU 601 and DMA channels 605 through a magneto-optical disk controller 607, which includes an error correction controller which implements the error correction logic referred to above.

Thus it is seen that a system and method for use in a computer which can reduce the time a user has to wait for formatting a disk by formatting on a time-distributed basis, and which can reduce the time needed to write on a magneto-optical disk by erasing portions of the disk in advance, are provided. One skilled in the art will appreciate that the present invention can be practiced by other than the described embodiments, which are presented for purposes of illustration and not of limitation, and the present invention is limited only by the claims which follow.

What is claimed is:

1. In computer system having a main memory and having a magneto-optical data storage medium of a type having data subdivisions which must be erased before they can be written on, a system for erasing previously used data subdivisions before they are needed again, said erasing system comprising:

means for maintaining a table of previously-used, formatted, erased data subdivisions;
means for maintaining a list of previously-used formatted data subdivisions to be erased;
means for automatically determining when said computer system is disk-idle;
means responsive to said disk-idle determining means and to said list maintaining means for automatically selecting from said list one of said previously-used subdivisions to be erased when said computer system is disk-idle; and
means for automatically erasing one of said subdivisions responsive to one of (a) selection by said selecting means of said one of said subdivisions upon a determination by said determining means that said computer system is disk-idle, and (b) a need by said computer system for access to one of said subdivisions when said table maintaining means indicates that no erased subdivisions exist.

2. The erasing system of claim 1 wherein said table maintaining means comprises means for storing a table on said medium, said table indicating the status of each of said subdivisions.

3. The erasing system of claim 1 wherein said list maintaining means comprises means for storing in said main memory a list of subdivisions to be erased.

4. The erasing system of claim 1 wherein said disk-idle determining means comprises:
means for measuring the passage of time;
means for detecting when said computer system seeks access to said data storage medium; and
means responsive to said time passage measuring means and to said access detecting means for making a determination of disk-idleness when a predetermined period of time passes without said computer system seeking access to said data storage medium.

5. The erasing system of claim 1 wherein:
said magneto-optic data storage medium has magnetic domains aligned in one of two directions representing logical 0 and logical 1 and having a magnet for applying a bias magnetic field, alignment of said magnetic domains being substantially fixed at room temperature, said magnetic domains aligning themselves with said bias magnetic field at temperatures above a threshold temperature, said data storage medium further having associated therewith means for generating a beam of coherent electromagnetic radiation for heating said medium to said threshold temperature for aligning said domains as desired; and
said erasing means comprises:
means for aligning said bias magnetic field in the direction representing logical 0;
means for causing said coherent beam generating means to generate a coherent beam of electromagnetic radiation focused on said selected one of said subdivisions for heating said selected one of said subdivisions above said threshold temperature, thereby causing each magnetic domain in said subdivision to represent a logical 0, said subdivision thereby being erased; and
means for recording in said list maintaining means that said subdivision is erased.

6. The erasing system of claim 1 wherein said list maintaining means comprises means for adding to said list, whenever a file is deleted, those ones of said subdivisions used by said file.

7. For use in a computer system having a main memory and having a magneto-optical data storage medium of a type having data subdivisions which must be erased before they can be written on, a method for erasing previously used data subdivisions before they are needed again, said erasing method comprising the steps of:

maintaining a table of previously-used, formatted, erased data subdivisions;

maintaining a list of previously-used formatted data subdivisions to be erased;

automatically determining when said computer system is disk-idle;

automatically selecting one of said previously-used subdivisions to be erased when said computer system is disk-idle; and automatically erasing one of said subdivisions responsive to one of (a) selection by said selecting step of said one of said subdivisions upon a determination that said computer system is disk-idle, and (b) a need by said computer system for access to one of said subdivisions when no erased subdivisions exist.

8. The erasing method of claim 7 wherein said table maintaining step comprises storing a table on said medium, said table indicating the status of each of said subdivisions.

9. The erasing method of claim 7 wherein said list maintaining step comprises storing in said main memory a list of subdivisions to be erased.

10. The erasing method of claim 7 wherein said disk-idle determining step comprises:

measuring the passage of time;

detecting when said computer system seeks access to said data storage medium; and making a determination of disk-idleness when a predetermined period of time passes without said computer system seeking access to said data storage medium.

11. The erasing method of claim 7 wherein said list maintaining step comprises means for adding to said list, whenever a file is deleted, those ones of said subdivisions used by said file.

12. The erasing method of claim 7 wherein:

said magneto-optic data storage medium has magnetic domains aligned in one of two directions representing logical 0 and logical 1 and having a magnet for applying a bias magnetic field, alignment of said magnetic domains being substantially fixed at room temperature, said magnetic domains aligning themselves with said bias magnetic field at temperatures above a threshold temperature, said data storage medium further having associated therewith means for generating a beam of coherent electromagnetic radiation for heating said medium to said threshold temperature for aligning said domains as desired; and said erasing step comprises:

aligning said bias magnetic field in the direction representing logical 0;

causing said coherent beam generating means to generate a coherent beam of electromagnetic radiation focused on said selected one of said subdivisions for heating said selected one of said subdivisions above said threshold temperature, thereby causing each magnetic domain in said subdivision to represent a logical 0, said subdivision thereby being erased; and recording in said list that said subdivision is erased.

13. In a computer system having a main memory and having a magneto-optical data storage medium of a type having data subdivisions which must be erased before they can be written on, a system for erasing previously used data subdivisions before they are needed again, said erasing system comprising:

means for maintaining a list of previously-used formatted data subdivisions to be erased;

means for automatically determining when said computer system is disk-idle;

means responsive to said disk-idle determining means and to said list maintaining means for automatically selecting one of said previously-used subdivisions to be erased when said computer system is disk-idle; and means for automatically erasing one of said subdivisions responsive to selection by said selecting means of said one of said subdivisions upon a determination by said determining means that said computer system is disk-idle.

14. The erasing system of claim 13 wherein said list maintaining means comprises means for storing in said main memory a list of subdivisions to be erased.

15. The erasing system of claim 13 wherein said disk-idle determining means comprises:

means for measuring the passage of time;

means for detecting when said computer system seeks access to said data storage medium; and means responsive to said time passage measuring means and to said access detecting means for making a determination of disk-idleness when a predetermined period of time passes without said computer system seeking access to said data storage medium.

16. The erasing system of claim 13 wherein:

said magneto-optic data storage medium has magnetic domains aligned in one of two directions representing logical 0 and logical 1 and having a magnet for applying a bias magnetic field, alignment of said magnetic domains being substantially fixed at room temperature, said magnetic domains aligning themselves with said bias magnetic field at temperatures above a threshold temperature, said data storage medium further having associated therewith means for generating a beam of coherent electromagnetic radiation for heating said medium to said threshold temperature for aligning said domains as desired; and said erasing means comprises:

means for aligning said bias magnetic field in the direction representing logical 0;

means for causing said coherent beam generating means to generate a coherent beam of electromagnetic radiation focused on said selected one of said subdivisions for heating said selected one of said subdivisions above said threshold temperature, thereby causing each magnetic domain in said subdivision to represent a logical 0, said subdivision thereby being erased; and means for recording in said list maintaining means that said subdivision is erased.

17. The erasing system of claim 13 wherein said list maintaining means comprises means for adding to said list, whenever a file is deleted, those ones of said subdivisions used by said file.

18. For use in a computer system having a main memory and having a magneto-optical data storage medium of a type having data subdivisions which must be erased before they can be written on, a method for erasing previously used data subdivisions before they are needed again, said erasing method comprising the steps of:

maintaining a list of previously-used formatted data subdivisions to be erased;

automatically determining when said computer system is disk-idle;

automatically selecting one of said previously-used subdivisions to be erased when said computer system is disk-idle; and automatically erasing one of said subdivisions responsive to said selecting step of said one of said subdivisions upon a determination that said computer system is disk-idle.

19. The erasing method of claim 18 wherein said list maintaining step comprising storing in said main memory a list of subdivisions to be erased.

20. The erasing method of claim 18 wherein said disk-idle determining step comprises:

measuring the passage of time;

detecting when said computer system seeks access to said data storage medium; and making a determination of disk-idleness when a predetermined period of time passes without said computer system seeking access to said data storage medium.

21. The erasing method of claim 18 wherein said list maintaining means comprises means for adding to said list, whenever a file is deleted, those ones of said subdivisions used by said file.

22. The erasing method of claim 18 wherein:

said magneto-optic data storage medium has magnetic domains aligned in one of two directions representing logical 0 and logical 1 and having a magnet for applying a bias magnetic field, alignment of said magnetic domains being substantially fixed at room temperature, said magnetic domains aligning themselves with said bias magnetic field at temperatures above a threshold temperature, said data storage medium further having associated therewith means for generating a beam of coherent electromagnetic radiation for heating said medium to said threshold temperature for aligning said domains as desired; and said erasing step comprises:

aligning said bias magnetic field in the direction representing logical 0;

causing said coherent beam generating means to generate a coherent beam of electromagnetic radiation focused on said selected one of said subdivisions for heating said selected one of said subdivisions above said threshold temperature, thereby causing each magnetic domain in said subdivision to represent a logical 0, said subdivision thereby being erased; and recording in said list that said subdivision is erased.

23. In a computer system having a magneto-optical data storage medium of a type having data subdivisions which must be erased before they can be written on, a system for erasing previously used data subdivisions before they are needed again, said erasing system comprising:

means for maintaining a table of previously-used, formatted, erased data subdivisions;

means for automatically erasing one of said subdivisions responsive to a need by said computer system for access to one of said subdivisions when said table maintaining means indicates that no erased subdivisions exist.

24. The erasing system of claim 21 wherein said table maintaining means comprises means for storing a table on said medium, said table indicating the status of each of said subdivisions.

25. The erasing system of claim 23 wherein:

said magneto-optic data storage medium has magnetic domains aligned in one of two directions representing logical 0 and logical 1 and having a magnet for applying a bias magnetic field, alignment of said magnetic domains being substantially fixed at room temperature, said magnetic domains aligning themselves with said bias magnetic field at temperatures above a threshold temperature, said data storage medium further having associated therewith means for generating a beam of coherent electromagnetic radiation for heating said medium to said threshold temperature for aligning said domains as desired; and said erasing means comprises:

means for aligning said bias magnetic field in the direction representing logical 0;

means for causing said coherent beam generating means to generate a coherent beam of electromagnetic radiation focused on said selected one of said subdivisions for heating said selected one of said subdivisions above said threshold temperature, thereby causing each magnetic domain in said subdivision to represent a logical 0, said subdivision thereby being erased; and means for recording in said list maintaining means that said subdivision is erased.

26. The erasing system of claim 23 wherein said table maintaining means comprises means for updating said table whenever a subdivision is erased.

27. For use in a computer system having a magneto-optical data storage medium of a type having data subdivisions which must be erased before they can be written on, a method for erasing previously used data subdivisions before they are needed again, said erasing method comprising the steps of:

maintaining a table of previously-used, formatted, erased data subdivisions; and automatically erasing one of said subdivisions responsive to a need by said computer system for access to one of said subdivisions when no erased subdivisions exist.

28. The erasing method of claim 27 wherein said table maintaining step comprises storing a table on said medium, said table indicating the status of each of said subdivisions.

29. The erasing method of claim 27 wherein said table maintaining step comprises means for updating said table whenever a subdivision is erased.

30. The erasing method of claim 27 wherein:

said magneto-optic data storage medium has magnetic domains aligned in one of two directions representing logical 0 and logical 1 and having a magnet for applying a bias magnetic field, alignment of said magnetic domains being substantially fixed at room temperature, said magnetic domains aligning themselves with said bias magnetic field at temperatures above a threshold temperature, said data storage medium further having associated therewith means for generating a beam of coherent electromagnetic radiation for heating said medium to said threshold temperature for aligning said domains as desired; and said erasing step comprises:

aligning said bias magnetic field in the direction representing logical 0;

causing said coherent beam generating means to generate a coherent beam of electromagnetic radiation focused on said selected one of said subdivisions for heating said selected one of said subdivisions above said threshold temperature, thereby causing each magnetic domain in said subdivision to represent a logical 0, said subdivision thereby being erased; and recording in said list that said subdivision is erased.

* * * * *